(12) United States Patent
Cui

(10) Patent No.: US 9,317,504 B2
(45) Date of Patent: Apr. 19, 2016

(54) METHOD FOR SEARCHING FOR FLASH VIDEO TAG IN BITSTREAM AND SEARCHING APPARATUS THEREOF

(75) Inventor: Jun Cui, GuangDong (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 126 days.

(21) Appl. No.: 13/810,209

(22) PCT Filed: Jul. 15, 2010

(86) PCT No.: PCT/CN2010/075184
§ 371 (c)(1),
(2), (4) Date: Jan. 15, 2013

(87) PCT Pub. No.: WO2012/006784
PCT Pub. Date: Jan. 19, 2012

(65) Prior Publication Data
US 2013/0117295 A1     May 9, 2013

(51) Int. Cl.
*G06F 17/30*        (2006.01)
*G11B 27/10*       (2006.01)
*G11B 27/30*       (2006.01)
(Continued)

(52) U.S. Cl.
CPC ........ *G06F 17/30017* (2013.01); *G11B 27/105* (2013.01); *G11B 27/3027* (2013.01); *H04N 21/42607* (2013.01); *H04N 21/84* (2013.01)

(58) Field of Classification Search
CPC ................... G06F 17/30864; G06F 17/30011; G06F 17/30696; G06F 17/2247; G06F 17/30876; G06F 17/2785; G06F 17/3028; G06F 3/16; G06F 9/3802; G06F 17/30026; G06F 17/30516
See application file for complete search history.

(56) References Cited

U.S. PATENT DOCUMENTS

| 6,377,748 | B1 * | 4/2002 | Schultz et al. ................. 386/241 |
| 7,730,238 | B1 * | 6/2010 | Arulambalam et al. ........ 710/52 |
| 8,543,720 | B2 * | 9/2013 | Wormley ......... H04N 21/23424 709/226 |

(Continued)

FOREIGN PATENT DOCUMENTS

| CN | 101246491 A | 8/2008 |
| CN | 101312531 A | 11/2008 |

(Continued)

OTHER PUBLICATIONS

Video File Format Specification Version 10 by Adobe Systems Incorporated (Published Nov. 2008).*

(Continued)

*Primary Examiner* — Angelica Ruiz
(74) *Attorney, Agent, or Firm* — Winston Hsu; Scott Margo

(57) ABSTRACT

A method for searching for a flash video (FLV) tag in a bitstream includes the following steps: setting a first start position and a first search length related to a first search process, wherein the first search length indicates a bitstream length of the first search process performed upon the bitstream; starting the first search process upon the bitstream from the first start position to search for the FLV tag; when the FLV tag is not found in the first search length, setting a second start position related to a second search process immediately following the first search process, wherein the first start position and the second start position are separated by a time period equaling a sum of the first search length and a first skip length corresponding to the first search process; and starting the second search process upon the bitstream from the second start position to search for the FLV tag.

25 Claims, 14 Drawing Sheets

(51) Int. Cl.
*H04N 21/426* (2011.01)
*H04N 21/84* (2011.01)

(56) References Cited

U.S. PATENT DOCUMENTS

| | | | |
|---|---|---|---|
| 8,612,384 B2 * | 12/2013 | Hall | 707/610 |
| 2005/0069039 A1 * | 3/2005 | Crinon | 375/240.26 |
| 2005/0262539 A1 * | 11/2005 | Barton et al. | 725/90 |
| 2006/0193387 A1 * | 8/2006 | Wu et al. | 375/240.16 |
| 2008/0240227 A1 * | 10/2008 | Wan et al. | 375/240 |
| 2009/0144772 A1 * | 6/2009 | Fink et al. | 725/42 |
| 2009/0254578 A1 * | 10/2009 | Hall | 707/101 |
| 2009/0262867 A1 * | 10/2009 | Wan et al. | 375/340 |
| 2010/0053336 A1 * | 3/2010 | Bourret | 348/180 |
| 2012/0002718 A1 * | 1/2012 | Jun et al. | 375/240.02 |

FOREIGN PATENT DOCUMENTS

| | | |
|---|---|---|
| CN | 101415069 A | 4/2009 |
| CN | 101778289 A | 7/2010 |
| KR | 1020090055544 | 6/2009 |

OTHER PUBLICATIONS

International Search Report mailed on May 12, 2011 for International application No. PCT/CN2010/075184, International filing date:Jul. 15, 2010.

* cited by examiner

| Field | Format | Description |
|---|---|---|
| Tag Type | UI18(1 byte) | 8：audio type，9：video type |
| Data Size | UI24(3 byte) | The byte length of data |
| Time Stamp | UI24(3 byte) | The playback time |
| Time Stamp Extended | UI18(1 byte) | The playback time |
| Stream ID | UI24(3 byte) | Usually 0 |
| Data | Audio data, video data or script data object | The data type in the FLV tag, such as audio data, video data, or script data object |

FIG. 1

| Field | Format | Description |
|---|---|---|
| Sound Format | UB[4](4 bit) | 0：Linear PCM，1：ADPCM，2：MP3，10：AAC |
| Sound Rate | UB[2](2 bit) | 0：5.5KHz，1：11KHz，2：22KHz，3：44KHz |
| Sound Size | UB[1](1 bit) | 0：8 bit，1：16 bit |
| Sound Type | UB[1](1 bit) | 0：mono，1：stereo |
| Sound Data | UI8[N] | Sound Data |

FIG. 2

| Field | Format | Description |
|---|---|---|
| Frame Type | UB[4](4 bit) | 1：Key Frame，2：Inter Frame |
| Code cld | UB[4](4 bit) | 1：JPEG，2：Sorenson H263，3：Screen Video，4：VP6，7：AVC |
| Video Data | UI8[N] | Video Data |

FIG. 3

METHOD FOR SEARCHING FOR FLASH VIDEO TAG IN BITSTREAM AND SEARCHING APPARATUS THEREOF

TECHNICAL FIELD

The present disclosure relates to searching for a video tag in a bitstream, and more particularly, to a searching apparatus and a related method for searching for a flash video (FLV) tag in a bitstream.

BACKGROUND

An FLV format is usually adopted in a media player, such as the Adobe Flash Player. In addition, the FLV format has been widely applied to many video websites, for example, You Tube, tudou, 56.com, ku6.com, Sina Video, and so on. Therefore, the support of the FLV format has become an indispensable part of multimedia functions in consumer electronic products, such as digital TVs, mobiles, or PDAs.

During a playback process of the FLV format, the video data and the audio data need to be extracted by using a "tag" as the basic unit to be decoded by a video decoder and an audio decoder, respectively. For this reason, the correct start position of each FLV tag must be found before the extraction of the video data and the audio data. However, since there is no start code available for locating the start position (or the relative position) of each FLV tag, the playback process of the data complying with the FLV format will be interrupted when an error occurs in the FLV tag.

Hence, how to improve the performance of searching the FLV tag has become an important issue to be solved by designers in this field.

SUMMARY

It is one of the objectives of the present disclosure to provide a searching apparatus and a related method for searching a bitstream for an FLV tag to solve the above-mentioned problems.

According to an embodiment of the present disclosure, a method for searching for a flash video (FLV) tag in a bitstream is provided. The method includes the following steps: setting a first start position and a first search length related to a first search process, wherein the first search length indicates a bitstream length of the first search process performed upon the bitstream; starting the first search process upon the bitstream from the first start position in order to search for the FLV tag; when the FLV tag is not found in the first search length, setting a second start position related to a second search process immediately following the first search process, wherein the first start position and the second start position are separated by a time period equaling a sum of the first search length and a first skip length corresponding to the first search process; and starting the second search process upon the bitstream from the second start position in order to search for the FLV tag.

According to another embodiment of the present disclosure, a searching apparatus for searching for a flash video (FLV) tag in a bitstream is provided. The searching apparatus includes a setting module and a searching module. The setting module is used for setting a first start position and a first search length related to a first search process, wherein the first search length indicates a bitstream length of the first search process performed upon the bitstream. The searching module is used for starting the first search process upon the bitstream from the first start position in order to search for the FLV tag. When the FLV tag is not found in the first search length, the setting module is further used for setting a second start position related to a second search process immediately following the first search process, where the first start position and the second start position are separated by a time period equaling a sum of the first search length and a first skip length corresponding to the first search process; and the searching module is further used for starting the second search process upon the bitstream from the second start position in order to search for the FLV tag.

These and other objectives of the present disclosure will no doubt become obvious to those of ordinary skill in the art after reading the following detailed description of the preferred embodiment that is illustrated in the various figures and drawings.

BRIEF DESCRIPTION OF DRAWINGS

FIG. 1 is a diagram illustrating a data structure of an FLV tag.

FIG. 2 is a diagram illustrating a data structure of an audio data in the FLV tag shown in FIG. 1.

FIG. 3 is a diagram illustrating a data structure of a video data in the FLV tag shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

First, in order to make the specification of the present disclosure easy to understand, a brief description of a data structure of an FLV tag is given as below.

Please refer to FIG. 1, which is a diagram illustrating a data structure of an FLV tag. As FIG. 1 depicts, an FLV tag includes a field named as "Tag Type", a field named as "Data Size", a field named as "Time Stamp", a field named as "Time Stamp Extended", a field named as "Stream ID", as well as a field named as "Data". Herein the field named as "Tag Type" indicates the tag type. Be noted that, when a byte value corresponding to the field "Tag Type" is equal to a first value (e.g., 8), it is indicative of an audio type; when the byte value corresponding to the field "Tag Type" is equal to a second value (e.g., 9), it is indicative of a video type. In addition, the field "Data Size" indicates a data length of the field "Data" in the FLV tag. The fields "Time Stamp" and "Time Stamp Extended" are related to the playback time. The byte value corresponding to the field "Stream ID" is usually 0. The field "Data" indicates the data type in the FLV tag, such as audio data, video data, or scrip data obj ect.

FIG. 2 is a diagram illustrating a data structure of an audio data in the FLV tag shown in FIG. 1, and FIG. 3 is a diagram illustrating a data structure of a video data in the FLV tag shown in FIG. 1. As FIG. 2 depicts, the audio data includes a sub-field named "Sound Format", a sub-field named "Sound rate", a sub-field named "Sound size", a sub-field named "Sound type", and a sub-field named "Sound Data". As FIG. 3 depicts, the video data includes a sub-field named "Frame Type", a sub-field named "Codec ID", and a sub-field named "Video Data". As the type and the descriptions corresponding to each sub-field have already been detailed in FIG. 2 and FIG. 3, and further description is omitted here for brevity.

Figure 4:
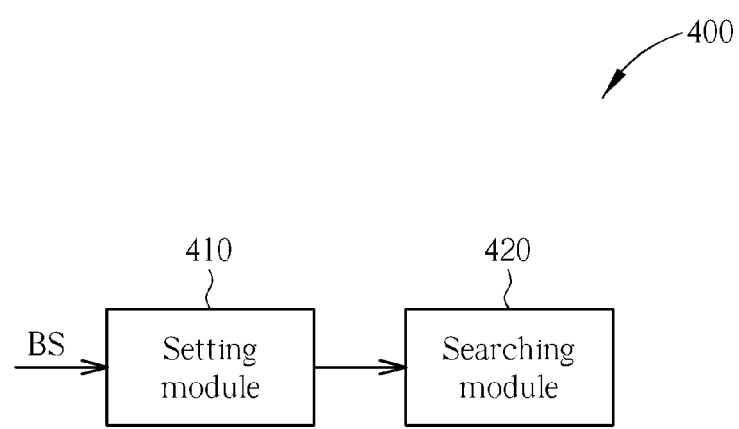
FIG. 4 is a block diagram illustrating a searching apparatus for searching a bitstream for an FLV tag according to a first embodiment of the present disclosure.
Figure 5:
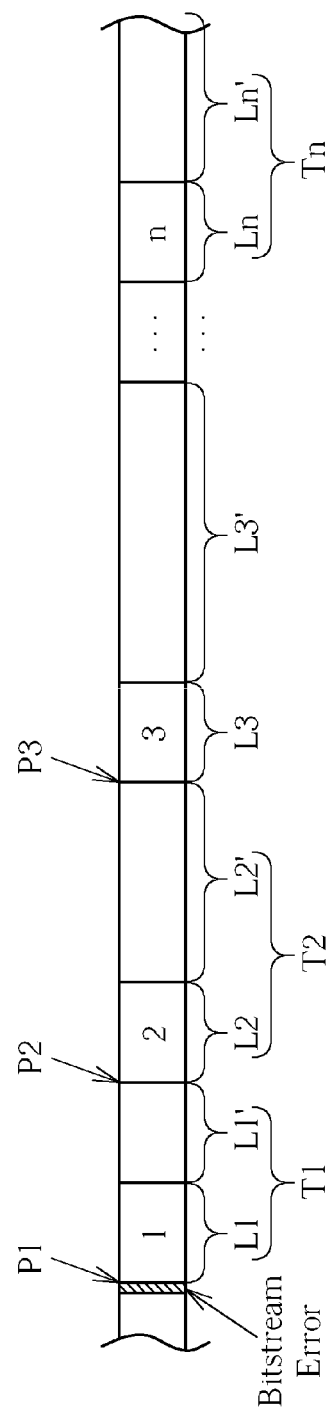
FIG. 5 is a diagram illustrating how to search a bitstream for an FLV tag.

Please refer to FIG. 4 together with FIG. 5. FIG. 4 is a block diagram illustrating a searching apparatus for searching for an FLV tag in a bitstream according to a first embodiment of the present disclosure, and FIG. 5 is a diagram illustrating how to search for an FLV tag in a bitstream BS. As shown in FIG. 4, the searching apparatus 400 includes a setting module 410 and a searching module 420. The setting module 410 is used for setting a first start position P1 and a first search length L1 related to a first search process SR1, wherein the first search length L1 indicates a bitstream length of the first search process SR1 performed upon the bitstream BS. The searching module 420 is used for starting the first search process SR1 upon the bitstream BS from the first start position P1 determined by the setting module 410 in order to search for the FLV tag. When the FLV tag is not found in the first search length L1, the setting module 410 is further used for setting a second start position P2 related to a second search process SR2 following the first search process SR1, where the first start position P1 and the second start position P2 are separated by a time period T1 equaling a sum of the first search length L1 and a first skip length L1' corresponding to the first search process SR1; and the searching module 420 is further used for starting the second search process SR2 upon the bitstream BS from the second start position P2 in order to search for the FLV tag.

Furthermore, when the FLV tag is not found in the first search length L1, the setting module 410 is further used for setting a second search length L2 related to the second search process SR2, wherein the second search length L2 indicates a bitstream length of the second search process SR2 performed upon the bitstream BS. Thus, when the FLV tag is not found in the second search length L2, the setting module 410 is further used for setting a third start position P3 related to a third search process SR3 following the second search process SR2, wherein the third start position P3 and the second start position P2 are separated by a time period T2 equaling a sum of the second search length L2 and a second skip length L2' corresponding to the second search process SR2. The following search processes may be easily deduced by analogy. For example, when the FLV tag is not found in the $n^{th}$ search length Ln, the setting module 410 is further used for setting a $(n+1)^{th}$ search length L(n+1) related to the $(n+1)^{th}$ search process SR(n+1), wherein the $(n+1)^{th}$ search length L(n+1) indicates a bitstream length of the $(n+1)^{th}$ search process SR(n+1) performed upon the bitstream BS.

Please note that, in this embodiment as shown in FIG. 5, the second skip length L2' is set to be larger than the first skip length L1', the third skip length L3' is set to be larger than the second skip length L2', and so on. But this in no way should be considered to be limitations of the scope of the present disclosure. In other embodiments, for example, the second skip length L2' may be set to be substantially equal to the first skip length L1', and so on. Certainly, people skilled in the art will readily appreciate that various modifications of these skip length L1'~Ln' are feasible without departing from the scope of the present disclosure.

Additionally, in this embodiment, the first search length L1 (or the second search length L2) may be set to be equal to a sum of a video tag size related to a video format and an audio tag size related to an audio format. In other embodiments, the search length L1~Ln may be set to be greater than or less than the sum of a video tag size related to a video format and an audio tag size related to an audio format, which also belongs to the scope of the present disclosure. Moreover, in this embodiment, the first start position P1 may be set as an error position where a bitstream error occurs in the bitstream BS, but this should not be considered to be limitations of the present disclosure.

Figure 6:
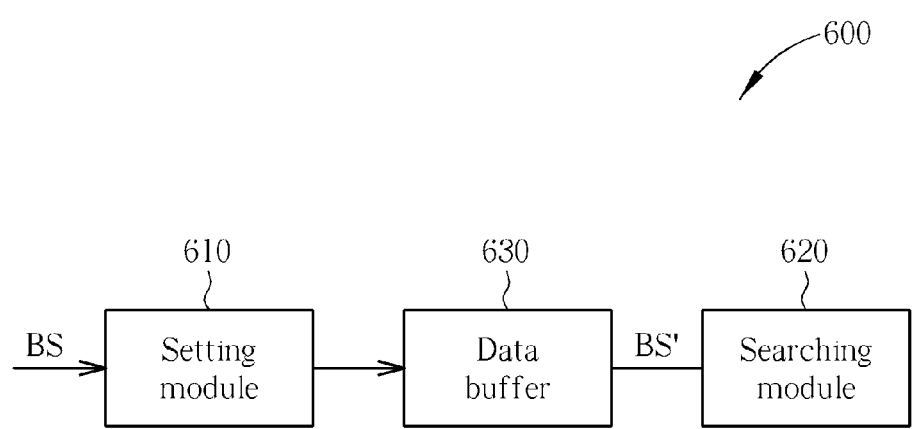
FIG. 6 is a block diagram illustrating a searching apparatus for searching a bitstream for an FLV tag according to a second embodiment of the present disclosure.

FIG. 6 is a block diagram illustrating a searching apparatus 600 for searching for an FLV tag in a bitstream according to a second embodiment of the present disclosure. The architecture of the searching apparatus 600 is similar to that of the searching apparatus 400 shown in FIG. 4, and the major difference between them is that the searching apparatus 600 further includes a data buffer 630 positioned between a setting module 610 and a searching module 620 for buffering a portion of the bitstream BS as indicated by the first search length L1. Therefore, the searching module 620 starts the first search process SR1 upon the buffered portion of the bitstream BS' from the first start position P1 in order to search for the FLV tag.

Please note that the searching module 420/620 may sequentially searches for the FLV tag in the bitstream (or the buffered portion of the bitstream BS) byte by byte according to a specific characteristic of the FLV tag. Further description is detailed as follows.

Figure 7:
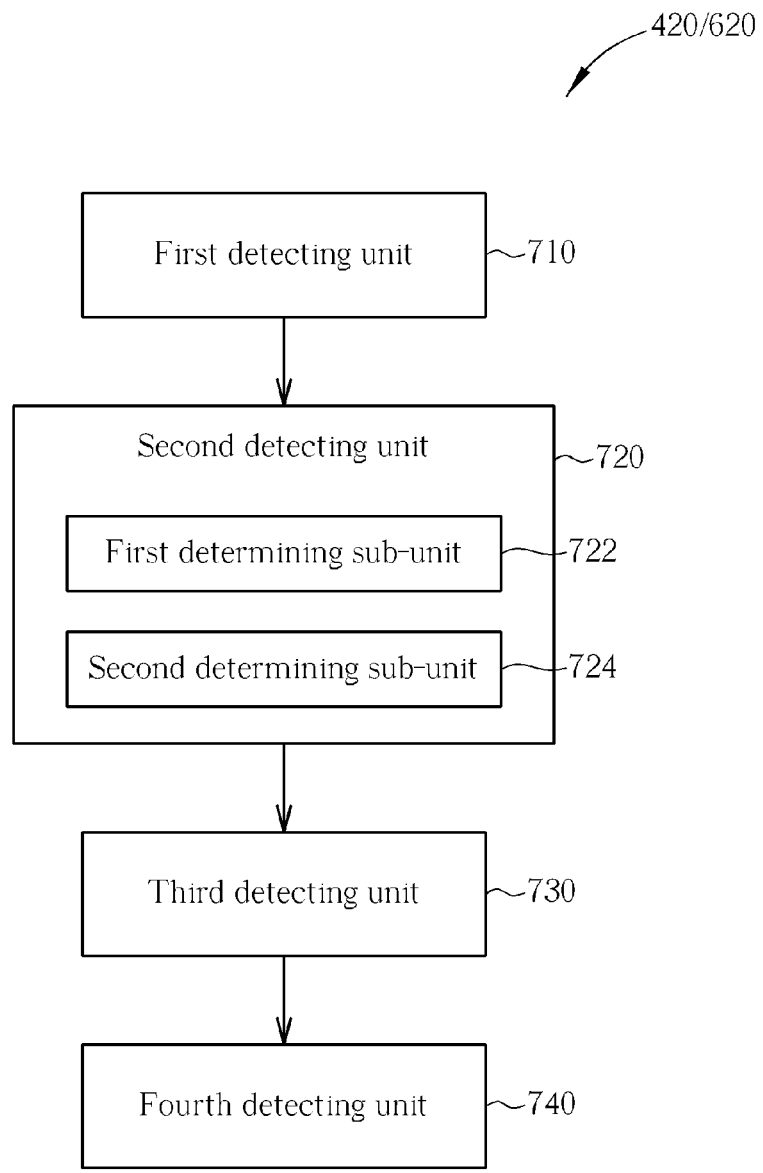
FIG. 7 is a diagram showing an exemplary implementation of the searching module shown in FIG. 4 or FIG. 6.

FIG. 7 is a diagram showing an exemplary implementation of the searching module 420/620 shown in FIG. 4 or FIG. 6. In this embodiment, the searching module 420/620 includes, but is not limited to, a first detecting unit 710, a second detecting unit 720, a third detecting unit 730, and a fourth detecting unit 740. Please also refer to FIG. 1 and FIG. 2. The first detecting unit 710 is used for detecting whether a byte value corresponding to a tag type in the bitstream is equal to a first value (e.g., 8) indicative of an audio type or a second value (e.g., 9) indicative of a video type. The second detecting unit 720 is used for detecting whether a byte value corresponding to a time stamp is greater than a threshold TH and determining whether a time stamp extended includes at least one byte value equal to a first predetermined value (e.g., 0) according to a detection result when the byte value corresponding to the tag type is equal to the first value (e.g., 8) or the second value (e.g., 9). Be noted that: the second detecting unit 720 may be implemented by a first determining sub-unit 722 and a second determining sub-unit 724. The first determining sub-unit 722 is used for determining whether a byte value corresponding to the time stamp extended is equal to the first predetermined value (e.g., 0) when the byte value corresponding to the time stamp is not greater than the threshold TH. The second determining sub-unit 724 is used for determining whether one byte value corresponding to a stream identification (ID) is equal to a second predetermined value (e.g., 0) when the byte value corresponding to the time stamp extended is equal to the first predetermined value (e.g., 0), and for determining whether one byte value corresponding to the stream ID is equal to the second predetermined value (e.g., 0) when the byte value corresponding to the time stamp is greater than the threshold TH.

In addition, the third detecting unit 730 is used for determining whether the byte value corresponding to the tag type in the bitstream is equal to the first value when the byte value corresponding to the stream ID is equal to the second predetermined value (e.g., 0). The fourth detecting unit 740 is used for determining whether an audio information is received when the byte value corresponding to the tag type is equal to the first value (e.g., 8), for determining whether a byte value corresponding to the audio information is equal to the received audio information when the audio information is received, and for indicating that the FLV tag related to an audio format is found when the byte value corresponding to the audio information is equal to the audio information.

Please note that the third detecting unit 730 shown in FIG. 7 may be configured for determining whether the byte value corresponding to the tag type in the bitstream is equal to the second value (e.g., 9) when the byte value corresponding to the stream ID is equal to the second predetermined value (e.g., 0); and the fourth detecting unit 740 shown in FIG. 7 may be configured for determining whether a codec ID is received when the byte value corresponding to the tag type is equal to the second value (e.g., 9), for determining whether a byte value corresponding to the codec ID is equal to the received codec ID, and for indicating that the FLV tag related to a video format is found when the byte value corresponding to the codec ID is equal to the received codec ID.

Please note that, in some embodiments, the threshold TH can be set as 0xffffff, which indicates the maximum byte value corresponding to the time stamp (3 bytes, or 24 bits). However, this is not meant to be a limitation of the present disclosure. In other embodiments, the threshold TH can be set to be smaller than 0xffffff, and the first determining sub-unit 722 can be used for determining whether a byte value corresponding to a combination of the remaining non-used part of the time stamp as well as the time stamp extended is equal to the first predetermined value (e.g., 0) when the byte value corresponding to the time stamp is not greater than the threshold TH.

Figure 8:
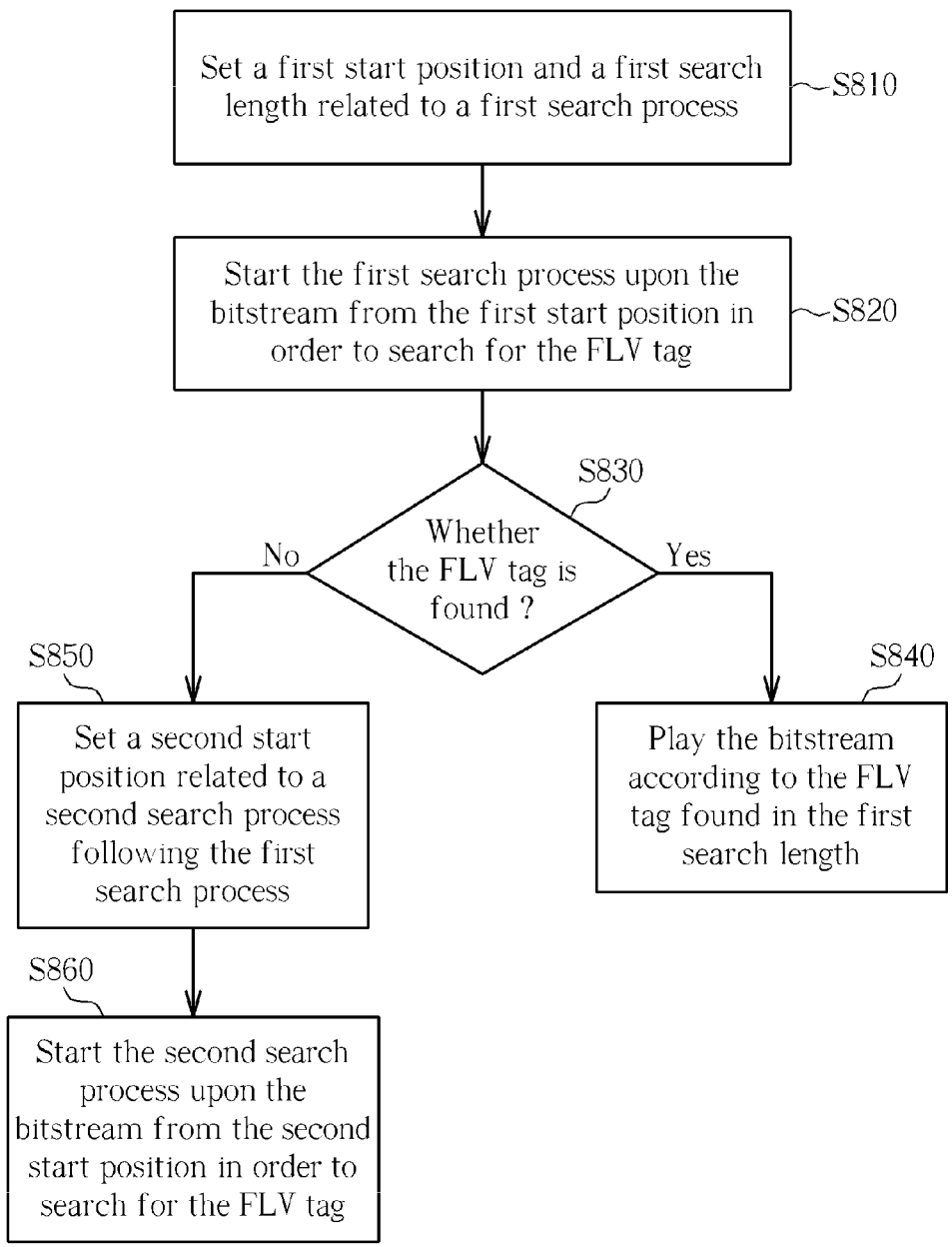
FIG. 8 is a flowchart illustrating a method for searching a bitstream for an FLV tag according to an exemplary embodiment of the present disclosure.

Please refer to FIG. 8. FIG. 8 is a flowchart illustrating a method for searching for an FLV tag in a bitstream according to an exemplary embodiment of the present disclosure. Please note that the following steps are not limited to be performed according to the exact sequence shown in FIG. 8 if a roughly identical result can be obtained. The method includes, but is not limited to, the following steps:

Step S810: Set a first start position and a first search length related to a first search process, wherein the first search length indicates a bitstream length of the first search process performed upon the bitstream.

Step S820: Start the first search process upon the bitstream from the first start position in order to search for the FLV tag.

Step S830: Whether the FLV tag is found. When the FLV tag is found, go to step S840; otherwise, go to step S850.

Step S840: Play the bitstream according to the FLV tag found in the first search length.

Step S850: Set a second start position related to a second search process following the first search process, wherein the first start position and the second start position are separated by a time period equaling a sum of the first search length and a first skip length corresponding to the first search process.

Step S860: Start the second search process upon the bitstream from the second start position in order to search for the FLV tag.

As a person skilled in the art can readily understand the details of the steps in FIG. 8 after reading above paragraphs directed to the searching apparatus 400, further description is omitted here for brevity. Herein the steps S810 and S850 may be executed by the setting module 410, and the steps S820 and S860 may be executed by the searching module 420.

Figure 9:
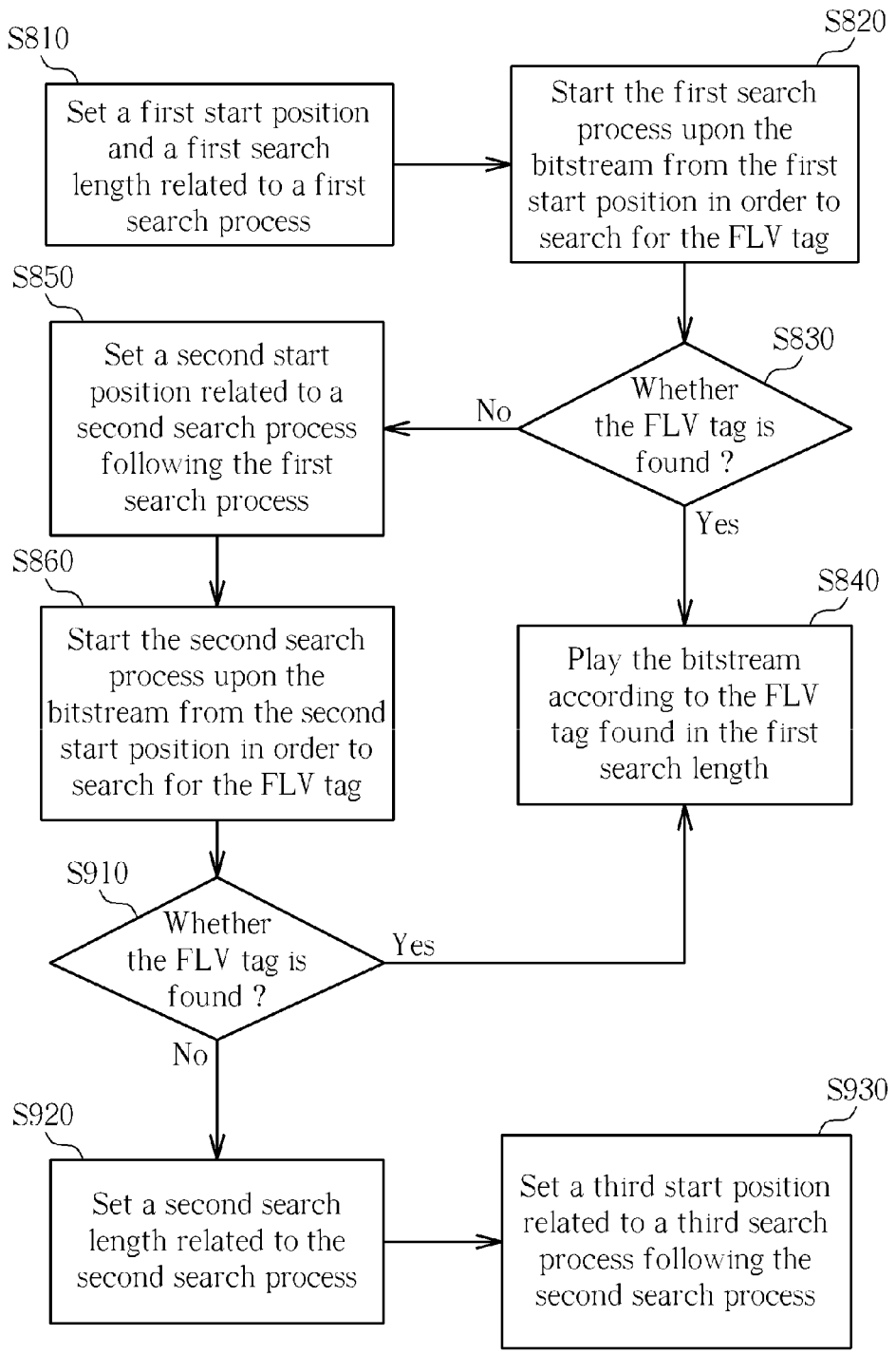
FIG. 9 is a flowchart illustrating a method for searching a bitstream for an FLV tag according to another exemplary embodiment of the present disclosure.

FIG. 9 is a flowchart illustrating a method for searching for an FLV tag in a bitstream according to another exemplary embodiment of the present disclosure. Please note that the following steps are not limited to be performed according to the exact sequence shown in FIG. 9 if a roughly identical result can be obtained. The method includes, but is not limited to, the following steps:

Step S810: Set a first start position and a first search length related to a first search process, wherein the first search length indicates a bitstream length of the first search process performed upon the bitstream.

Step S820: Start the first search process upon the bitstream from the first start position in order to search for the FLV tag.

Step S830: Whether the FLV tag is found. When the FLV tag is found, go to step S840; otherwise, go to step S850.

Step S840: Play the bitstream according to the found FLV tag.

Step S850: Set a second start position related to a second search process following the first search process, wherein the first start position and the second start position are separated by a time period equaling a sum of the first search length and a first skip length corresponding to the first search process.

Step S860: Start the second search process upon the bitstream from the second start position in order to search for the FLV tag.

Step S910: Whether the FLV tag is found. When the FLV tag is found, go to step S840; otherwise, go to step S920.

Step S920: Set a second search length related to the second search process, wherein the second search length indicates a bitstream length of the second search process performed upon the bitstream.

Step S930: Set a third start position related to a third search process following the second search process, wherein the third start position and the second start position are separated by a time period equaling a sum of the second search length and a second skip length corresponding to the second search process.

The steps shown in FIG. 9 are similar to the steps shown in FIG. 8, and the difference between them is that the flowchart shown in FIG. 9 further includes two steps S920 and S930 employed for setting the second search length related to the second search process when the FLV tag is not found in the first search length and for setting a third start position related to a third search process following the second search process when the FLV tag is not found in the second search length, respectively.

Figure 10:
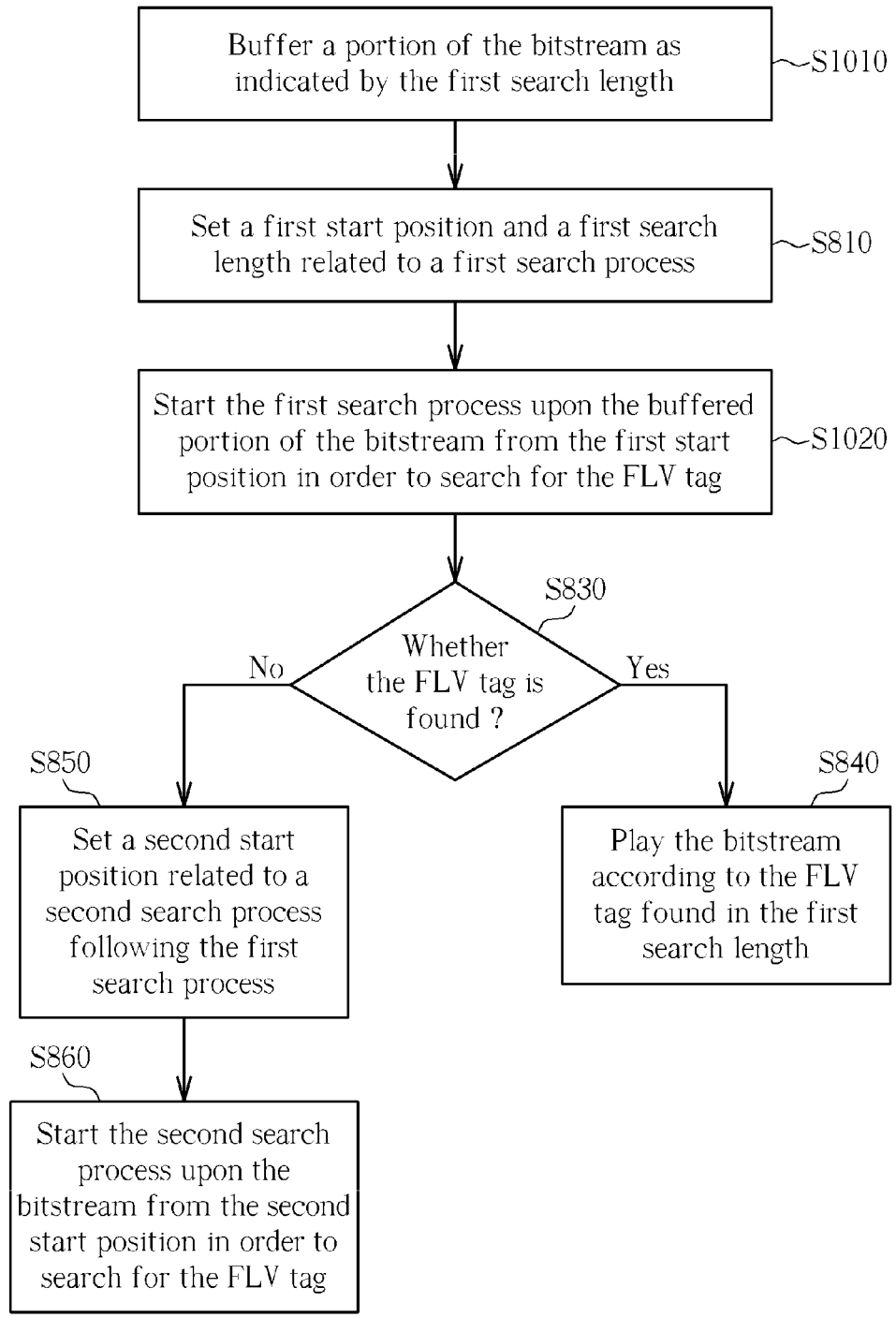
FIG. 10 is a flowchart illustrating a method for searching a bitstream for an FLV tag according to another exemplary embodiment of the present disclosure.

FIG. 10 is a flowchart illustrating a method for searching for an FLV tag in a bitstream according to yet another exemplary embodiment of the present disclosure. Please note that the following steps are not limited to be performed according to the exact sequence shown in FIG. 10 if a roughly identical result can be obtained. The method includes, but is not limited to, the following steps:

Step S1010: Buffer a portion of the bitstream as indicated by the first search length.

Step S810: Set a first start position and a first search length related to a first search process, wherein the first search length indicates a bitstream length of the first search process performed upon the bitstream.

Step S1020: Start the first search process upon the buffered portion of the bitstream from the first start position in order to search for the FLV tag.

Step S830: Whether the FLV tag is found. When the FLV tag is found, go to step S840; otherwise, go to step S850.

Step S840: Play the bitstream according to the found FLV tag.

Step S850: Set a second start position related to a second search process following the first search process, wherein the first start position and the second start position are separated by a time period equaling a sum of the first search length and a first skip length corresponding to the first search process.

Step S860: Start the second search process upon the bitstream from the second start position in order to search for the FLV tag.

The steps shown in FIG. 10 are similar to the steps shown in FIG. 8, and the difference between them is that the flowchart shown in FIG. 10 further includes a step for buffering a portion of the bitstream as indicated by the first search length (i.e., the step S1010), and the step S820 originally shown in FIG. 8 is replaced by the step S1020. Please note that operations of the steps S1010 and S1020 are also detailed in the abovementioned embodiment shown in FIG. 6.

Please note that, the steps of the abovementioned flowchart are presented merely for describing the present invention, and in no way should be considered to be limitations of the scope of the present invention. Those skilled in the art should observe that the methods shown in FIG. 8, FIG. 9, and FIG. 10 can include other intermediate steps or several steps can be merged into a single step without departing from the spirit of the present invention. For example, the step S820 shown in FIG. 8 and FIG. 9 or the step S1020 shown in FIG. 10 may be performed by sequentially searching for the FLV tag in the bitstream byte by byte according to a specific characteristic of the FLV tag, and may further include several detailed steps. Please refer to FIG. 11A, which is a flowchart illustrating the detailed steps of sequentially searching for the FLV tag in the bitstream byte by byte by reference to the specific characteristic of the FLV tag. The method includes, but is not limited to, the following steps:

Step S1110: Detect whether a byte value corresponding to a tag type in the bitstream is equal to a first value indicative of an audio type or a second value indicative of a video type.

Step S1120: Detect a byte value corresponding to a time stamp, and detect a byte value corresponding to a time stamp extended.

Step S1130: Determine whether the FLV tag related to an audio format is found when the byte value corresponding to the tag type is equal to the first value.

Step S1140: Determine whether the FLV tag related to a video format is found when the byte value corresponding to the tag type is equal to the second value.

Figure 11A:
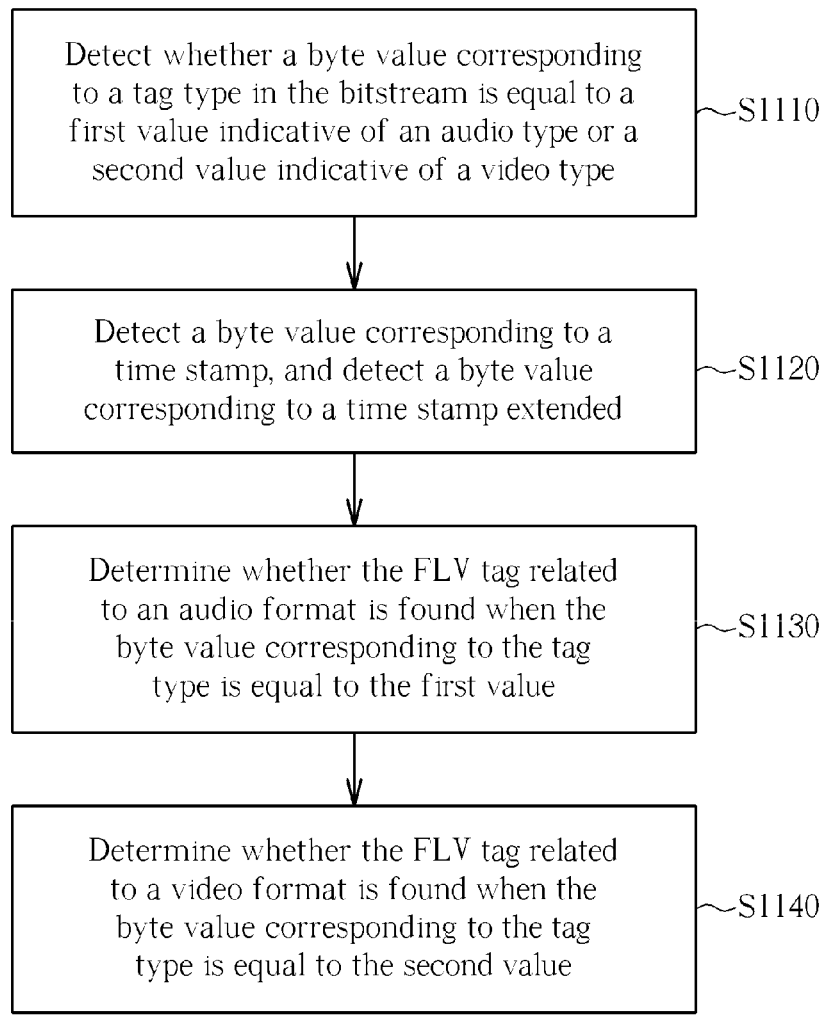
FIG. 11A is a flowchart illustrating the step of sequentially searching the bitstream byte by byte for the FLV tag by reference to the specific characteristic of the FLV tag according to an exemplary embodiment of the present disclosure.
Figure 11B:
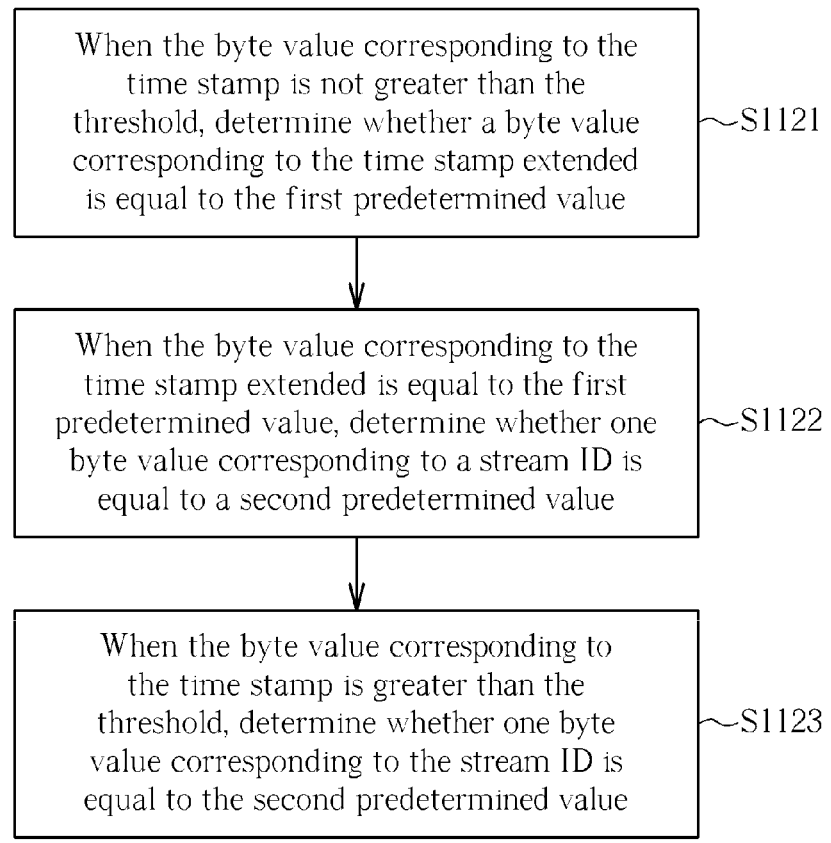
FIG. 11B is a flowchart illustrating the detailed steps of the step S1210 shown in FIG. 11A.

FIG. 11B is a flowchart illustrating the detailed steps of the step S1120 shown in FIG. 11A, which includes the following detailed steps:

Step S1121: When the byte value corresponding to the time stamp is not greater than the threshold, determine whether a byte value corresponding to the time stamp extended is equal to the first predetermined value.

Step S1122: When the byte value corresponding to the time stamp extended is equal to the first predetermined value, determine whether one byte value corresponding to a stream identification (ID) is equal to a second predetermined value.

Step S1123: When the byte value corresponding to the time stamp is greater than the threshold, determine whether one byte value corresponding to the stream ID is equal to the second predetermined value.

Figure 11C:
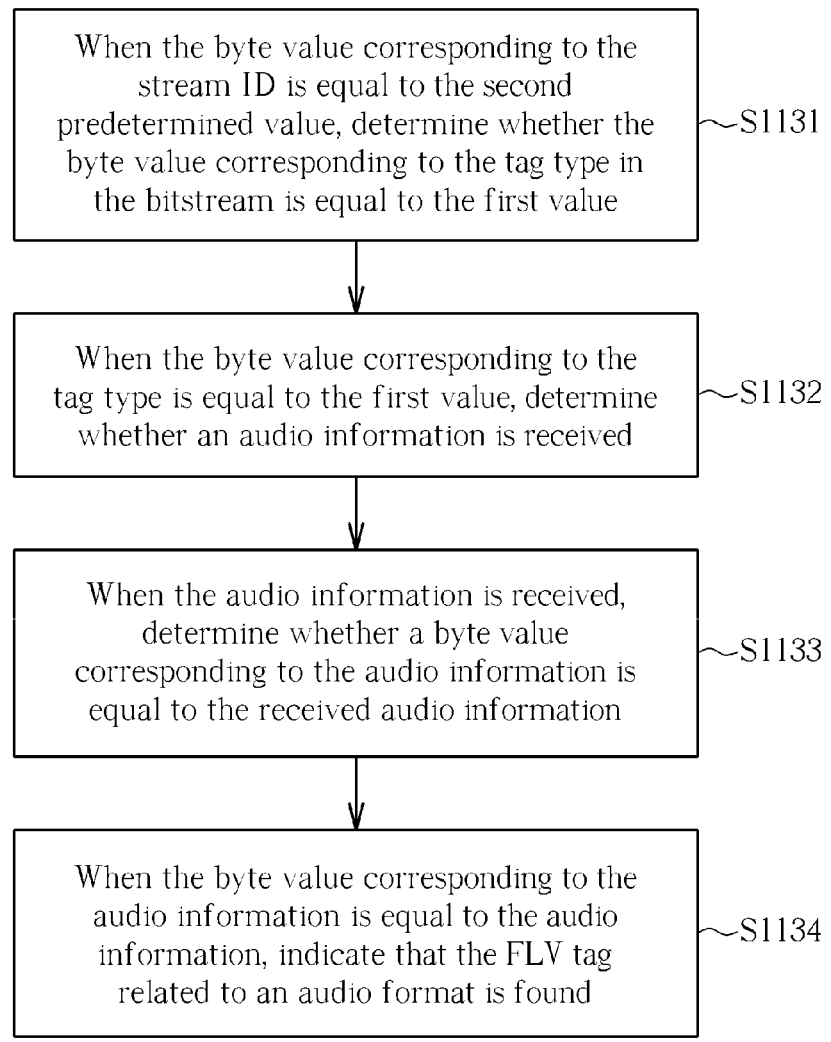
FIG. 11C is a flowchart illustrating the detailed steps of the step S1220 shown in FIG. 11A.

FIG. 11C is a flowchart illustrating the detailed steps of the step S1130 shown in FIG. 11A, which includes the following detailed steps:

Step S1131: When the byte value corresponding to the stream ID is equal to the second predetermined value, determine whether the byte value corresponding to the tag type in the bitstream is equal to the first value.

Step S1132: When the byte value corresponding to the tag type is equal to the first value, determine whether an audio information is received.

Step S1133: When the audio information is received, determine whether a byte value corresponding to the audio information is equal to the received audio information.

Step S1134: When the byte value corresponding to the audio information is equal to the audio information, indicate that the FLV tag related to an audio format is found.

Figure 11D:
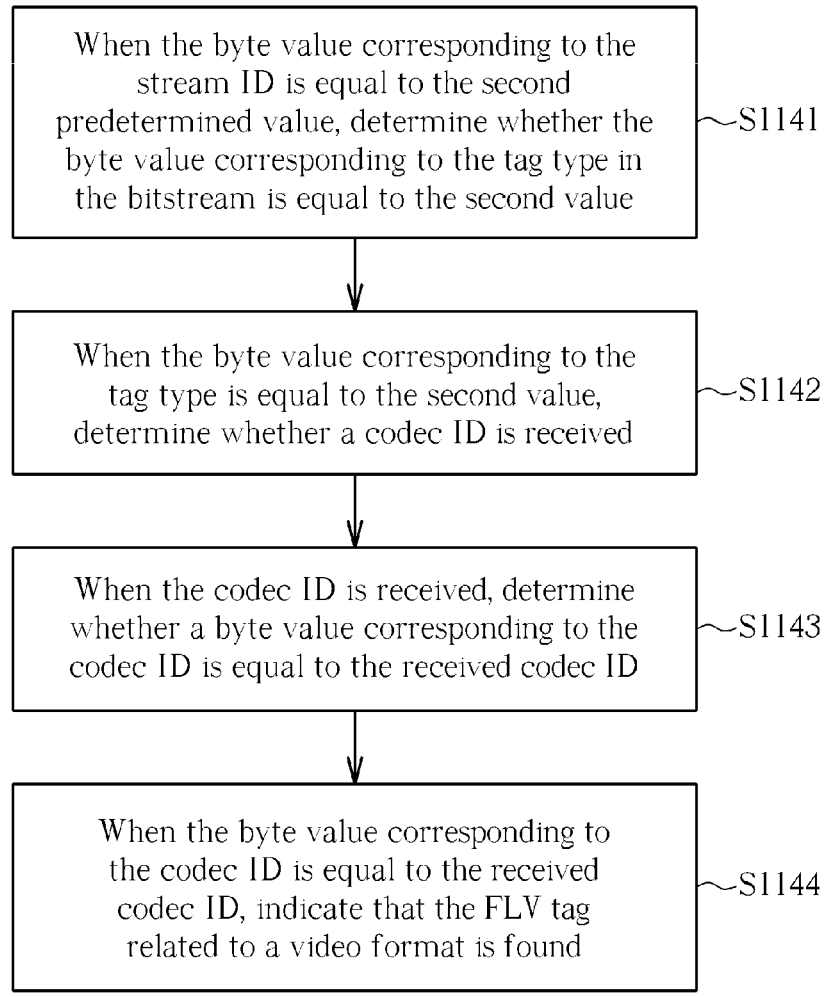
FIG. 11D is a flowchart illustrating the detailed steps of the step S1230 shown in FIG. 11A.

FIG. 11D is a flowchart illustrating the detailed steps of the step S1140 shown in FIG. 11A, which includes the following steps:

Step S1141: When the byte value corresponding to the stream ID is equal to the second predetermined value, determine whether the byte value corresponding to the tag type in the bitstream is equal to the second value.

Step S1142: When the byte value corresponding to the tag type is equal to the second value, determine whether a codec ID is received.

Step S1143: When the codec ID is received, determine whether a byte value corresponding to the codec ID is equal to the received codec ID.

Step S1144: When the byte value corresponding to the codec ID is equal to the received codec ID, indicate that the FLV tag related to a video format is found.

Please note that, the steps of the abovementioned flowchart are presented merely for describing the present invention, and in no way should be considered to be limitations of the scope of the present invention. Those skilled in the art should observe that the methods shown in FIG. 8, FIG. 9, FIG. 10, and FIG. 11A-FIG. 11D may include other intermediate steps or several steps can be merged into a single step without departing from the spirit of the present invention.

The above-mentioned embodiments are presented merely for describing features of the present disclosure, and in no way should be considered to be limitations of the scope of the present disclosure. In summary, the present disclosure provides a searching apparatus and a related method for searching for an FLV tag in a bitstream. By inserting the skip length disclosed in the present disclosure into each search process, the FLV tag can be found more easily and more quickly for the extraction of the video data and the audio data. Therefore, the playback process of the data complying with the FLV format can be played unceasingly when an error occurs in the FLV tag.

Those skilled in the art will readily observe that numerous modifications and alterations of the device and method may be made while retaining the teachings of the invention.

The invention claimed is:

1. A method for searching for a flash video (FLV) tag in a bitstream, comprising:
   setting a first start position and a first search length related to a first search process, wherein the first search length indicates a bitstream length of the first search process performed upon the bitstream and corresponds to a minimum bitstream length in which an FLV tag should exist;
   starting the first search process upon the bitstream from the first start position in order to search for the FLV tag;
   when no FLV tag is found in the first search length, setting a second start position related to a second search process following the first search process, wherein the first start position and the second start position are separated by a time period equaling a sum of the first search length and a first skip length set according to the first search process, the first skip length being different from the first search length; and
   starting the second search process upon the bitstream from the second start position in order to search for the FLV tag;
   wherein the step of setting the first start position and the first search length, the step of starting the first search process, the step of setting the second start position, and the step of starting the second search process are performed by a searching apparatus.

2. The method of claim 1, further comprising:
   when no FLV tag is found in the first search length, setting a second search length related to the second search process, wherein the second search length indicates a bitstream length of the second search process performed upon the bitstream; and
   when no FLV tag is found in the second search length, setting a third start position related to a third search process following the second search process, wherein the third start position and the second start position are separated by a time period equaling a sum of the second search length and a second skip length corresponding to the second search process.

3. The method of claim 2, wherein the second skip length is approximately equal to the first skip length.

4. The method of claim 2, wherein the second skip length is larger than the first skip length.

5. The method of claim 1, wherein the first search length is equal to a sum of a video tag size related to a video format and an audio tag size related to an audio format.

6. The method of claim 1, further comprising:
   buffering a portion of the bitstream as indicated by the first search length; wherein the step of starting the first search process upon the bitstream from the first start position comprises:
   starting the first search process upon the buffered portion of the bitstream from the first start position in order to search for the FLV tag.

7. The method of claim 1, wherein the step of starting the first search process upon the bitstream from the first start position in order to search for the FLV tag comprises:
   sequentially searching for the FLV tag in the bitstream byte by byte according to a specific characteristic of the FLV tag.

8. The method of claim 7, wherein the step of sequentially searching for the FLV tag in the bitstream byte by byte according to the specific characteristic of the FLV tag comprises:
   detecting whether a byte value corresponding to a tag type in the bitstream is equal to a first value indicative of an audio type or a second value indicative of a video type.

9. The method of claim 8, wherein the step of sequentially searching for the FLV tag in the bitstream byte by byte according to the specific characteristic of the FLV tag further comprises:
   when the byte value corresponding to the tag type is equal to the first value or the second value, detecting whether a byte value corresponding to a time stamp is greater than a threshold and determining whether a time stamp extended includes at least one byte value equal to a first predetermined value according to a detection result.

10. The method of claim 9, wherein the step of determining whether the time stamp extended include at least one byte value equal to the first predetermined value according to the detection result comprises:
    when the byte value corresponding to the time stamp is not greater than the threshold, determining whether a byte value corresponding to the time stamp extended is equal to the first predetermined value;
    when the byte value corresponding to the time stamp extended is equal to the first predetermined value, determining whether one byte value corresponding to a stream identification (ID) is equal to a second predetermined value; and
    when the byte value corresponding to the time stamp is greater than the threshold, determining whether one byte value corresponding to the stream ID is equal to the second predetermined value.

11. The method of claim 10, wherein the step of sequentially searching for the FLV tag in the bitstream byte by byte according to the specific characteristic of the FLV tag further comprises:
    when the byte value corresponding to the stream ID is equal to the second predetermined value, determining whether the byte value corresponding to the tag type in the bitstream is equal to the first value;
    when the byte value corresponding to the tag type is equal to the first value, determining whether an audio information is received;
    when the audio information is received, determining whether a byte value corresponding to the audio information is equal to the received audio information; and
    when the byte value corresponding to the audio information is equal to the audio information, indicating that the FLV tag related to an audio format is found.

12. The method of claim 10, wherein the step of sequentially searching for the FLV tag the bitstream byte by byte by according to the specific characteristic of the FLV tag further comprises:
    when the byte value corresponding to the stream ID is equal to the second predetermined value, determining whether the byte value corresponding to the tag type in the bitstream is equal to the second value;
    when the byte value corresponding to the tag type is equal to the second value, determining whether a codec ID is received;
    when the codec ID is received, determining whether a byte value corresponding to the codec ID is equal to the received codec ID; and when the byte value corresponding to the codec ID is equal to the received codec ID, indicating that the FLV tag related to a video format is found.

13. A searching apparatus for searching for a flash video (FLV) tag in a bitstream, comprising:
 a hardware setting module, for setting a first start position and a first search length related to a first search process, wherein the first search length indicates a bitstream length of the first search process performed upon the bitstream and corresponds to a minimum bitstream length in which an FLV tag should exist; and
 a hardware searching module, for starting the first search process upon the bitstream from the first start position in order to search for the FLV tag;
 wherein when no FLV tag is found in the first search length, the setting module is further used for setting a second start position related to a second search process immediately following the first search process, where the first start position and the second start position are separated by a time period equaling a sum of the first search length and a first skip length set according to the first search process, the first skip length being different from the first search length; and the searching module is further used for starting the second search process upon the bitstream from the second start position in order to search for the FLV tag.

14. The searching apparatus of claim 13, wherein the setting module is further used for:
 setting a second search length related to the second search process when no FLV tag is found in the first search length, wherein the second search length indicates a bitstream length of the second search process performed upon the bitstream; and
 setting a third start position related to a third search process following the second search process when no FLV tag is found in the second search length, wherein the third start position and the second start position are separated by a time period equaling a sum of the second search length and a second skip length corresponding to the second search process.

15. The searching apparatus of claim 14, wherein the second skip length is approximately equal to the first skip length.

16. The searching apparatus of claim 14, wherein the second skip length is larger than the first skip length.

17. The searching apparatus of claim 13, wherein the first search length is equal to a sum of a video tag size related to a video format and an audio tag size related to an audio format.

18. The searching apparatus of claim 13, further comprising:
 a data buffer, for buffering a portion of the bitstream as indicated by the first search length;
 wherein the searching module starts the first search process upon the buffered portion of the bitstream from the first start position in order to search for the FLV tag.

19. The searching apparatus of claim 13, wherein the searching module sequentially searches for the FLV tag in the bitstream byte by byte according to a specific characteristic of the FLV tag.

20. The searching apparatus of claim 19, wherein the searching module comprises:
 a first detecting unit, for detecting whether a byte value corresponding to a tag type in the bitstream is equal to a first value indicative of an audio type or a second value indicative of a video type.

21. The searching apparatus of claim 20, wherein the searching module further comprises:
 a second detecting unit, for detecting whether a byte value corresponding to a time stamp is greater than a threshold and determining whether a time stamp extended includes at least one byte value equal to a first predetermined value according to a detection result when the byte value corresponding to the tag type is equal to the first value or the second value.

22. The searching apparatus of claim 21, wherein the second detecting unit further comprises:
 a first determining sub-unit, for determining whether a byte value corresponding to the time stamp extended is equal to the first predetermined value when the byte value corresponding to the time stamp is not greater than the threshold; and
 a second determining sub-unit, for determining whether one byte value corresponding to a stream identification (ID) is equal to a second predetermined value when the byte value corresponding to the time stamp extended is equal to the first predetermined value, and for determining whether one byte value corresponding to the stream ID is equal to the second predetermined value when the byte value corresponding to the time stamp is greater than the threshold.

23. The searching apparatus of claim 22, wherein the searching module further comprises:
 a third detecting unit, for determining whether the byte value corresponding to the tag type in the bitstream is equal to the first value when the byte value corresponding to the stream ID is equal to the second predetermined value; and
 a fourth detecting unit, for determining whether an audio information is received when the byte value corresponding to the tag type is equal to the first value, for determining whether a byte value corresponding to the audio information is equal to the received audio information when 10 the audio information is received, and for indicating that the FLV tag related to an audio format is found when the byte value corresponding to the audio information is equal to the audio information.

24. The searching apparatus of claim 22, wherein the searching module further comprises:
 a third detecting unit, for determining whether the byte value corresponding to the tag type in the bitstream is equal to the second value when the byte value corresponding to the stream ID is equal to the second predetermined value;
 a fourth detecting unit, for determining whether a codec ID is received when the byte value corresponding to the tag type is equal to the second value, for determining whether a byte value corresponding to the codec ID is equal to the received codec ID, and for indicating that the FLV tag related to a video format is found when the byte value corresponding to the codec ID is equal to the received codec ID.

25. The method of claim 1, further comprising:
 by inserting at least one skip length into at least one search process, correctly finding at least one FLV tag in the bitstream without being hindered by an error of the bitstream, for extraction of video data and audio data in the bitstream.

* * * * *